United States Patent
Cai et al.

(10) Patent No.: US 11,776,288 B2
(45) Date of Patent: Oct. 3, 2023

(54) OBJECT DETECTION METHOD, AND TRAINING METHOD FOR A TARGET OBJECT DETECTION MODEL

(71) Applicant: UBTECH ROBOTICS CORP LTD, Shenzhen (CN)

(72) Inventors: Yonghui Cai, Shenzhen (CN); Jun Cheng, Shenzhen (CN); Jianxin Pang, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 224 days.

(21) Appl. No.: 17/389,380

(22) Filed: Jul. 30, 2021

(65) Prior Publication Data
US 2022/0156534 A1     May 19, 2022

(30) Foreign Application Priority Data
Nov. 17, 2020  (CN) .......................... 202011290074.5

(51) Int. Cl.
*G06N 3/04* (2023.01)
*G06V 30/24* (2022.01)
*G06V 10/94* (2022.01)
*G06T 3/40* (2006.01)
*G06F 18/214* (2023.01)

(52) U.S. Cl.
CPC ........ *G06V 30/2504* (2022.01); *G06T 3/4046* (2013.01); *G06V 10/95* (2022.01); *G06F 18/2148* (2023.01); *G06N 3/04* (2013.01); *G06V 2201/07* (2022.01)

(58) Field of Classification Search
CPC ...... G06V 10/94; G06V 10/95; G06V 10/454; G06V 30/18057; G06V 10/70; G06V 10/10; G06V 10/20; G06V 30/194; G06V 10/82; G06V 2201/07; G06V 30/2504; G06V 10/80; G06V 10/806; G06T 3/4046; G06T 2207/20084; G06N 3/04; G06N 3/0464; G06N 3/0475; G06N 3/0495; G06N 3/0499; G06N 3/02; G06N 20/00; G06F 18/00; G06F 18/21; G06F 18/25; G06F 18/253
See application file for complete search history.

(56) References Cited

PUBLICATIONS

"Object detection based on improved YOLOv3-tiny." 2019 Chinese automation congress (CAC). IEEE; (Year: 2019).*

* cited by examiner

*Primary Examiner* — Sumati Lefkowitz
*Assistant Examiner* — Michael Adam Shariff (57) ABSTRACT

A target object detection model is provided. The target object detection model includes a YOLOv3-Tiny model. Through the target object detection model, low-level information in the YOLOv3-Tiny sub-model can be merged with high-level information therein, so as to fuse the low-level information and the high-level information. Since the low-level information can be further used, the comprehensiveness of target detection is effectively improved, and the detection effect of small targets is improved.

18 Claims, 7 Drawing Sheets

(Related Art)

OBJECT DETECTION METHOD, AND TRAINING METHOD FOR A TARGET OBJECT DETECTION MODEL

CROSS REFERENCE TO RELATED PRESENT DISCLOSURES

The present disclosure claims priority to Chinese Patent Present disclosure No. 202011290074.5, filed Nov. 17, 2020, which is hereby incorporated by reference herein as if set forth in its entirety.

BACKGROUND

1. Technical Field

The present disclosure relates to object detection technology, and particularly to a target object detection model.

2. Description of Related Art

Object detection is one of the basic tasks in computer vision technology. In recent years, with the rapid development of neural networks, deep learning-based object detection algorithms have also flourished. The deep learning-based object detection algorithm adopts an end-to-end solution, that is, the image inputting to the task result outputting is completed in one step, which effectively improves the efficiency of problem solving. However, in the actual process of detecting moving target, there will be many factors such as hardware technique limitations, target occlusion, and multi-target interference which will affect the detection effect. Therefore, there is a lot of space for improving the accuracy and real-time of detection.

YOLOv3 is the third improved version of the YOLO target detection algorithm, which has a significant improvement in detection accuracy and speed compared to other algorithms, and is the first choice among the current target detection techniques. YOLOv3-Tiny compresses the network structure while basically maintains the original performance of YOLOv3, so that the algorithm can meet the real-time detection requirement even in the case of small memory, which helps to solve the problems of high power consumption and small memory in practical applications. However, in actual uses, the YOLOv3-Tiny model has a poor detection effect on small targets, and it is difficult to meet the needs of application scenarios.

BRIEF DESCRIPTION OF THE DRAWINGS

To describe the technical schemes in the embodiments of the present disclosure or in the prior art more clearly, the following briefly introduces the drawings required for describing the embodiments or the prior art. It should be noted that, the drawings in the following description merely show some embodiments. For those skilled in the art, other drawings can be obtained according to the drawings without creative efforts.

DETAILED DESCRIPTION

In order to make the objectives, technical solutions, and advantages of the present disclosure clearer, the following further describes the present disclosure in detail with reference to the drawings and embodiments. It should be understood that, the embodiments described herein are only for explaining the present disclosure, and are not used to limit thereto.

Figure 1:
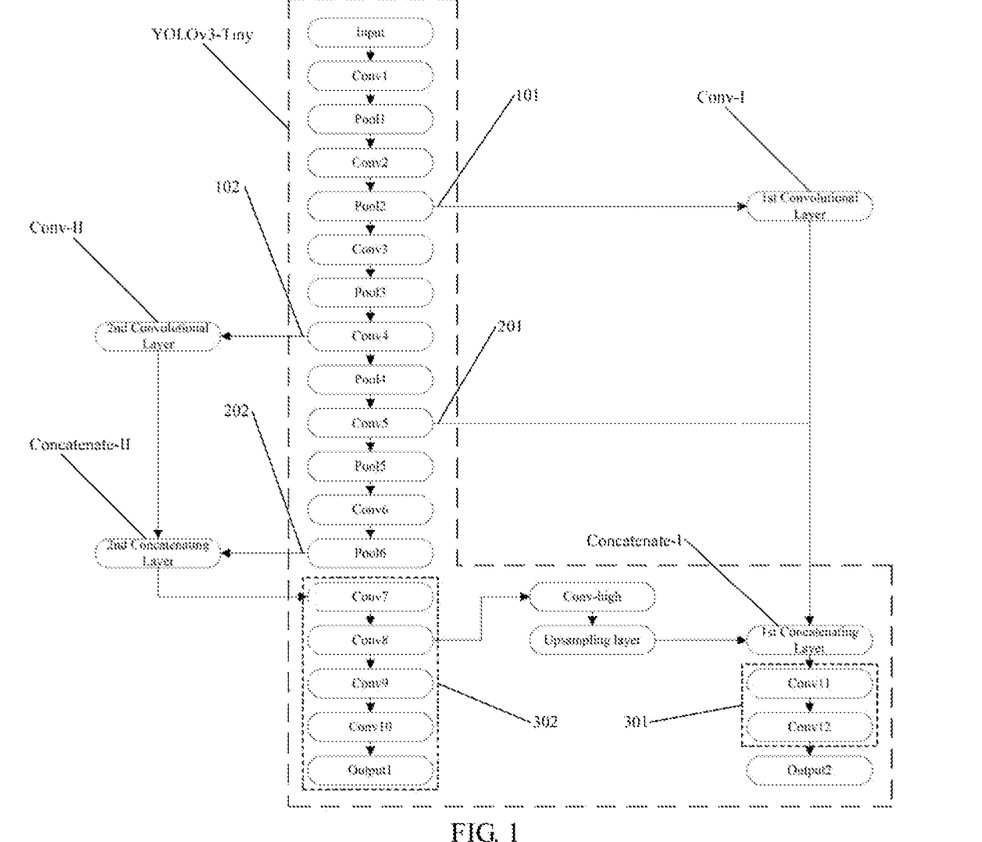
FIG. 1 is a schematic diagram of the structure of an embodiment of a target object detection model according to the present disclosure.

FIG. 1 is a schematic diagram of the structure of an embodiment of a target object detection model according to the present disclosure. The target object detection model is based on a YOLOv3-Tiny model (see FIG. 7).

Figure 7:
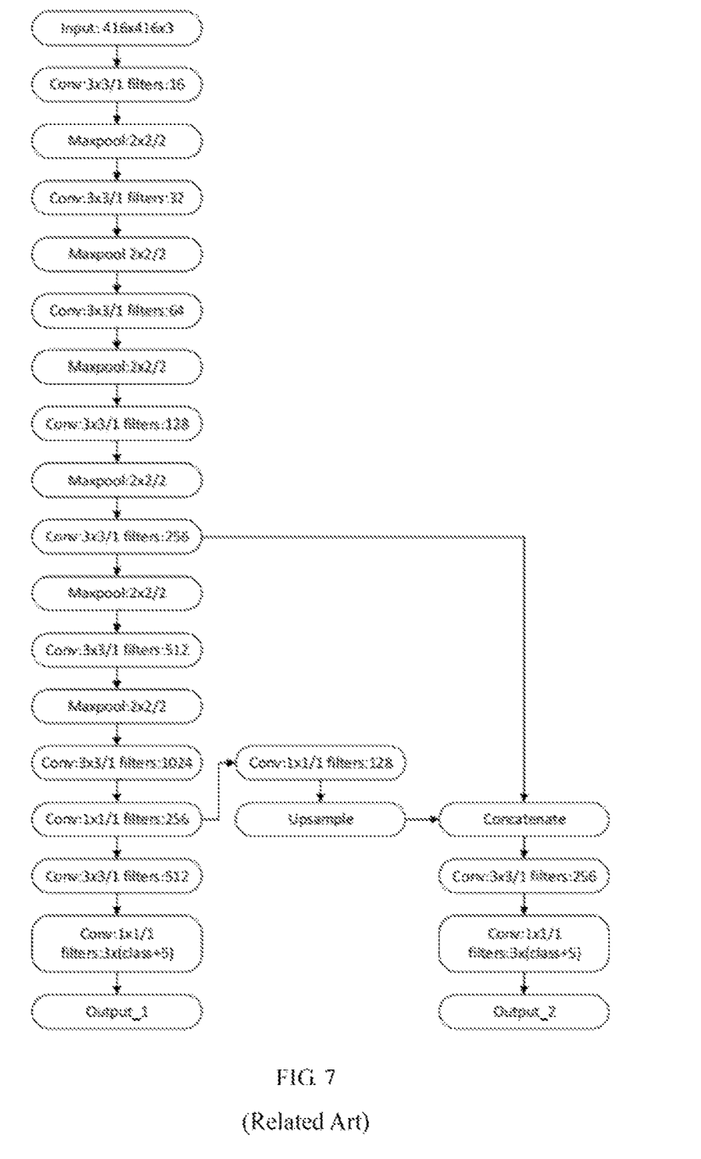
FIG. 7 is a schematic diagram of an example of a YOLOv3-Tiny model according to the present disclosure.

The YOLO-v3-Tiny model includes an input receiving a to-be-detected image, convolutional layers Conv1~Conv6 and pooling layers Pool1-Pool6 alternately connected to the input in series, convolutional layers Conv7~Conv10 connected in series to an output Output1, a high-level information convolutional layer Conv-high connected to the convolutional layer Conv8, an upsampling layer connected to the high-level information convolutional layer Conv-high, a first concatenating layer Concatenate-I connected to an output Output2 through two convolutional layers Conv11~Conv12 in series. The convolutional layers Conv11~Conv12 are considered as first high-level information convolution layers 301, and the convolutional layers Conv7~Conv10 are considered as second high-level information convolution layers 302.

The target object detection model further includes a first convolutional layer Conv-I, a second convolutional layer Conv-II, and a second concatenating layer Concatenate-II. An input end of the first convolutional layer Conv-I is connected to a first low-level information output end 101 of the YOLOv3-Tiny model. An output end of the first convolutional layer Conv-I and a high-level information first output end 201 of the YOLOv3-Tiny model are connected to an input end of the first concatenating layer Concatenate-I. The second convolutional layer Conv-II has an input end connected to a second low-level information output end 102 of the YOLOv3-Tiny model, and an output end connected to the second concatenating layer Concatenate-II. The second concatenating layer Concatenate-II is also connected to another high-level information second output end 202 of the YOLOv3-Tiny model, and has an output end connected to the convolutional layer Conv7 of the YOLOv3-Tiny model. The second pooling layer Pool2 has the first low-level information output end 101, the fourth convolutional layer Conv4 has the second low-level information output end 102, the fifth convolutional layer Conv5 has the high-level information output end 201, and the sixth pooling layer Pool6 has the another high-level information output end 202.

The first convolutional layer Conv-I performs convolutions on low-level information of a to-be-detected image received from the first low-level information output end 101 of the YOLOv3-Tiny model. The first concatenating layer Concatenate-I receives and performs concatenation on the low-level information received from the first convolutional layer Conv-I and the high-level information from the high-level information first output end 201. The concatenated low-level information is stored in the first concatenating layer Concatenate-I.

The second convolutional layer Conv-II performs convolutions on the low-level information of the to-be-detected image received from the second low-level information output end 102 of the YOLOv3-Tiny model. The second concatenating layer Concatenate-II receives and performs concatenation on the low-level information output from the second convolutional layer Conv-II and the high-level information from the high-level information second output end 202.

The concatenated information output from second concatenating layer Concatenate-II is performed convolutions by the convolutional layers Conv7 and Conv8, and then output to the high-level information convolutional layer Conv-high. The high-level information output from the high-level information convolutional layer Conv-high is upsampled and then output to the first concatenating layer Concatenate-I. The first concatenating layer Concatenate-I performs concatenation on the upsampled high-level information and the concatenated low-level information. The concatenated high and low level information is performed convolutions by the convolutional layers Conv11 and Conv 12, and then output through Output 2.

Consequently, feature map of the low-level information and the feature map of the high-level information are merged, so that the low-level information can be further used. In which, the low-level information of the to-be-detected image refers to the color, texture, shape and other information of the image, and the high-level information of the to-be-detected image refers to the features close to human understanding that are expressed by the image. The high-level information may be information being performed relatively more times of convolutions thereon. Since small objects occupies fewer pixels in the image, they are difficult to identify during the training process and are easily filtered out after passing through multiple convolutional layers and pooling layers, and then identification failure is caused. Since YOLOv3-Tiny is a lightweight model, the false detection rate and missed detection rate for small target objects in the field of view will be extremely high when the model is used without improvement, and is far from meeting the needs of reality. In this embodiment, the target object detection model with the improved model structure merges the feature map of the low-level information in the YOLOv3-Tiny model and the feature map of the high-level information in the YOLOv3-Tiny model through the first concatenating layer Concatenate-I and the second concatenating layer Concatenate-II, so that the low-level information can be further used so as to reduce the probability that the feature map of small objects be filtered out after passing through multiple convolutional layers and pooling layers (since the low-level information is located at the upper layer of the model, it has not passed through many convolutional and pooling layers and therefore has a larger probability of containing the feature map of small objects), so that the target object detection model with the improved model structure can accurately identify the small target objects.

In one embodiment, the scales of the first convolutional layer Conv-I and the second convolutional layer Conv-II are both 7*7.

Figure 2:
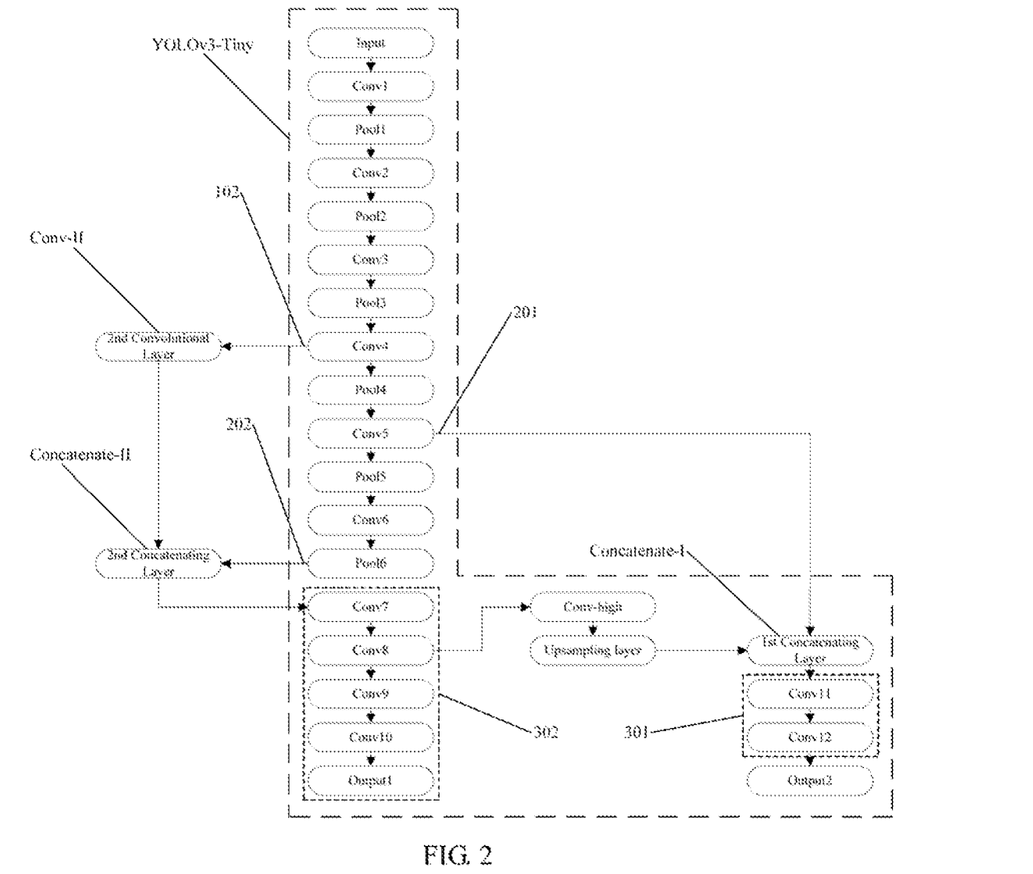
FIG. 2 is a schematic diagram of the structure of another embodiment of a target object detection model according to the present disclosure.

FIG. 2 is a schematic diagram of the structure of another embodiment of a target object detection model according to the present disclosure. As shown in FIG. 2, another target object detection model based on the YOLOv3-Tiny model is provided. The YOLOv3-Tiny model includes an input, convolutional layers Conv1~Conv6 and pooling layers Pool1-Pool6 alternately connected in series, convolutional layers Conv7~Conv10 connected in series to an output Output1, a high-level information convolutional layer Conv-high connected to the convolutional layer Conv8, an upsampling layer connected to the high-level information convolutional layer Conv-high, a first concatenating layer Concatenate-I connected to an output Output2 through two convolutional layers Conv11~Conv12.

The target object detection model further includes a second convolutional layer Conv-II, and a second concatenating layer Concatenate-II. A high-level information first output end 201 of the YOLOv3-Tiny model is connected to an input end of the first concatenating layer Concatenate-I. The second convolutional layer Conv-II has an input end connected to a second low-level information output end 102 of the YOLOv3-Tiny model, and an output end connected to the second concatenating layer Concatenate-II. The second concatenating layer Concatenate-II is also connected to a high-level information second output end 202 of the YOLOv3-Tiny model, and has an output end connected to the convolutional layer Conv7 of the YOLOv3-Tiny model.

The first concatenating layer Concatenate-I receives and performs concatenation on the low-level information received from and the high-level information from the high-level information first output end 201. The concatenated low-level information is stored in the first concatenating layer Concatenate-I. The second convolutional layer Conv-II performs convolutions on the low-level information of the to-be-detected image received from the second low-level information output end 102 of the YOLOv3-Tiny model. The second concatenating layer Concatenate-II receives and performs concatenation on the low-level information output from the second convolutional layer Conv-II and the high-level information from the high-level information second output end 202. The concatenated information output from second concatenating layer Concatenate-II is performed convolutions by the convolutional layers Conv7 and Conv8, and then output to the high-level information convolutional layer Conv-high. The high-level information output from the high-level information convolutional layer Conv-high is upsampled and then output to the first concatenating layer Concatenate-I. The first concatenating layer Concatenate-I performs concatenation on the upsampled high-level information and the concatenated low-level information. The concatenated high and low level information is performed convolutions by the convolutional layers Conv11 and Conv 12, and then output through Output 2.

Consequently, the feature map of the low-level information and the feature map of the high-level information are merged, so that the low-level information can be further used. In which, the low-level information of the to-be-detected image refers to the color, texture, shape and other information of the image, and the high-level information of the to-be-detected image refers to the features close to human understanding that are expressed by the image. Since small objects occupies fewer pixels in the image, they are difficult to identify during the training process and are easily filtered out after passing through multiple convolutional layers and pooling layers, and then identification failure is caused. Since YOLOv3-Tiny is a lightweight model, the false detection rate and missed detection rate for small target objects in the field of view will be extremely high when the model is used without improvement, and is far from meeting the needs of reality. In this embodiment, the target object detection model with the improved model structure merges the feature map of the low-level information in the YOLOv3-Tiny model and the feature map of the high-level information in the YOLOv3-Tiny model through the first concatenating layer Concatenate-I and the second concatenating layer Concatenate-II, so that the low-level information can be further used so as to reduce the probability that the feature map of small objects be filtered out after passing through multiple convolutional layers and pooling layers (since the low-level information is located at the upper layer of the model, it has not passed through many convolutional and pooling layers and therefore has a larger probability of containing the feature map of small objects), so that the target object detection model with the improved model structure can accurately identify the small target objects.

In the target object detection model improved based on the YOLOv3-Tiny model, the low-level information and high-level information are fused through the model structure, so that the low-level information can be further used, and the comprehensiveness of target detection is effectively improved while the detection effect of small targets is improved.

Figure 3:
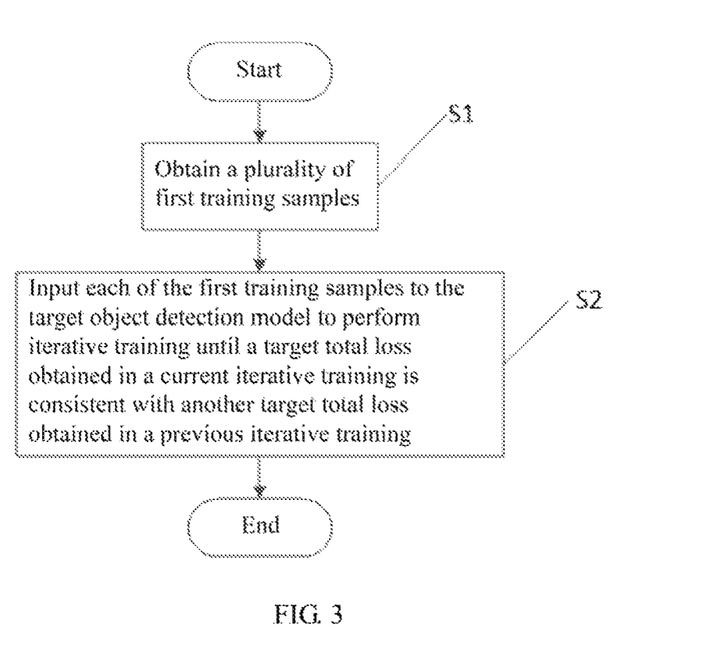
FIG. 3 is a flow chart of an embodiment of a target object detection model training method according to the present disclosure.

FIG. 3 is a flow chart of an embodiment of a target object detection model training method according to the present disclosure. A target object detection model training method is provided, which is for training a target object detection model, where the structure of the target object detection model is the same as the structure of the target object detection model described in any of the above-mentioned embodiment. As shown in FIG. 3, the training method includes:

S1: obtaining a plurality of first training samples, where each of the first training samples is an image marked with one or more target object(s); and S2: inputting each of the first training samples to the target object detection model to perform iterative training until a target total loss obtained in a current iterative training is consistent with another target total loss obtained in a previous iterative training.

In this embodiment, the model structure of the target object detection model is the same as the model structure of the above-mentioned target object detection model improved based on the YOLOv3-Tiny model. The target object detection model training method includes: obtaining, through a system, a plurality of first training samples, where the first training sample is an image marked as a target object, where the marking of the target object is manually performed by the developer. Based on the idea of deep learning, the system inputs each first training sample into the target object detection model for iterative training, so that the target object detection model can learn the category characteristics of the target object, and the finally trained target object detection model can be used in application scenarios to automatically identify the coordinate and category of the kind of target object (that is, the target object marked in the first training sample) through the input images. During the iterative training of the target object detection model, the model will output the corresponding loss corresponding to each target object in the first training sample after each training, and the sum of all the losses of the target objects is the target total loss. If it is detected that the target total loss obtained in the current iterative training of the model is the same as the target total loss obtained in the previous iterative training, that is, the target total loss no more decreases during the iterative training of the model, it is determined that the training of the target object detection model is completed, and the iterative training can be stopped. In this embodiment, the trained target object detection model is based on the unique model structure of the target object detection model itself, which can realize the fusion of the low-level information and high-level information of the input images, and improve the use of the low-level information. The target object detection model trained on this basis can improve the rate and accuracy of the identification of small target objects, and effectively improve the detection effect of small target objects.

Furthermore, the target total loss is the sum of a plurality of target object losses. The step of inputting each of the first training samples to the target object detection model to perform iterative training includes:

S201: selecting a total loss of small target objects from each of the target object losses according to a preset size, where the size of the small target objects corresponds to the preset size;

S202: determine whether a ratio between the total loss of the small target objects and the target total loss is smaller than a threshold in the current iterative training; and S203: splicing every preset number of the first training samples into an image to obtain a plurality of second training samples and training the target object detection model using each of the second training samples before a next iterative training, in response to the ratio being smaller than the threshold.

In this embodiment, the target total loss is the sum of a plurality of target object losses. The developer defines the image size of the small target objects in advance, that is, defines a preset size. The system identifies the small target objects corresponding to the preset size according to the preset size, so as to select the loss corresponding to each small target object from the target object losses. Then a sum is calculated according to the loss corresponding each small target object to obtain the total loss of the small target objects. The target object detection model is iteratively trained, and the model will output the corresponding loss of each target object in the first training sample after completing each training. The system calculates the sum according to the loss corresponding to each target object to obtain the target total loss, and obtain the total loss of the small target objects by calculating the sum according to the loss corresponding to each selected small target object. In the current iterative training, the system determines whether the ratio between the total loss of the small target objects and the target total loss is larger than or equal to a preset threshold. If yes, the first training sample does not need to be spliced during the next iterative training of the model; otherwise, if the ratio between the total loss of the small target objects and the target total loss is less than the preset threshold, before the next iterative training, the system will randomly select a preset number of first training samples from the first training samples to reduce according to the preset size, and the reduced preset number of first training samples are spliced to form an image, and the image formed after splicing is the second training sample. During the next iterative training, the system uses several newly formed second training samples to train the target object detection model. During the iteration process of the training of the target object detection model, the loss of the small target objects hardly contributes to the total loss. For example, in the 50% iteration of training COCO data set, the loss of the small target objects accounts for less than 10% of the total loss, hence the imbalance of the optimized target will reduce the detection performance of the model to small target objects. In this embodiment, during the iterative training of the model, if the ratio between the total loss of the small target objects and the target total loss is less than the threshold, the first training samples are reduced and spliced to form a second training sample, and the second training sample is used to train the target object detection model, so as to increase the proportion of the loss of the small target objects in the total loss, so that the model can fully learn the feature information of the small target objects, and finally improve the rate and accuracy of identifying of the trained target object detection model to small target objects, and the detection effect of small target objects is improved.

Furthermore, the step of splicing every preset number of the first training samples into the image to obtain the plurality of second training samples and training the target object detection model using each of the second training samples includes:

S2031: selecting a preset number of the first training samples randomly to reduce according to a preset ratio to obtain a plurality of third training samples, where an image aspect ratio of the third training sample is equal to an image aspect ratio of the first training sample;

S2032: splicing the third training samples into a same image to obtain the second training sample, where an image size of the second training sample is consistent with an image size of the first training sample.

In this embodiment, the system randomly selects the preset number of first training samples to reduce according to the preset ratio (or a preset uniform size, that is, reduce the image size of the first training sample to the uniform size) to obtain a plurality of third training samples. In which the image aspect ratio of the reduced third training sample is the same as the image aspect ratio of the first training sample before the reduction, thereby preventing the loss of the attribute of the target object. The system splices the preset number of the third training samples into the same image to form a new image, that is, to obtain the second training sample. The image size of the spliced second training sample is consistent with the image size of the first training sample to ensure that the basic attributes (i.e., the image size) of the training samples remain consistent throughout the iterative training of the model. Through the above-mentioned splicing, during the iterative training of the model, some large and medium objects will be reduced as small objects, thereby increasing the proportion of the loss of the small target objects in the total loss, so that the optimization direction of the model can be adjusted, which improves the detection effect of the trained model on small target objects.

In the provided training method for the target object detection model, the system obtains a plurality of the first training samples, where the first training samples where the first training sample is an image marked with target object (s). The system inputs each first training sample into the target object detection model for iterative training until the target total loss obtained in the current iterative training is consistent with the target total loss obtained in the previous iterative training, then the iterative training is stopped. In the target object detection model improved based on the YOLOv3-Tiny model, the low-level information and high-level information are fused through the model structure, so that the low-level information can be further used, and the comprehensiveness of target detection is effectively improved and the detection effect of small targets is improved. The target object detection model trained on the basis of this model structure can be used to accurately identify small target objects in the input images, which improves the detection effect of small target objects while ensuring the detection speed of the target object.

Figure 4:
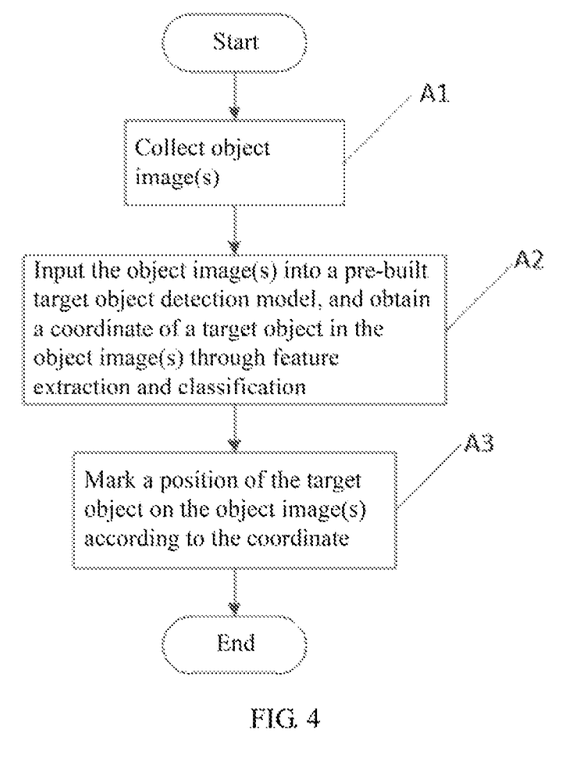
FIG. 4 is a flow chart of an embodiment of an object detection method according to the present disclosure.

FIG. 4 is a flow chart of an embodiment of an object detection method according to the present disclosure. An object detection method is provided. As shown in FIG. 4, the object detection method includes:

A1: collecting object image(s);

A2: inputting the object image(s) into a pre-built target object detection model, and obtaining a coordinate of a target object in the object image(s) through feature extraction and classification, where the target object detection model is obtained through any one of the above-mentioned the method for training the target object detection model; and A3: marking a position of the target object on the object image(s) according to the coordinate.

In this embodiment, the system collects object images through a camera, and inputs the object images into a pre-built target object detection model, where the target object detection model is a model trained by the training method of any of the above-mentioned target object detection models. After the object image undergoes the convolution processing of each convolution layer and the pooling processing of each pooling layer in the target object detection model, feature extraction and classification are realized, so as to obtain the coordinate and category of the target object in the object image. The system marks the target object on the object image according to the coordinate of the target object output by the target object detection model. For example, a frame can be used to frame the target object on the object image so as to indicate the position of the target object on the object image. In this embodiment, due to its unique model structure, the target object detection model increases the use of the low-level information by merging the high-level information and the low-level information during processing the input object image, which reduces the probability of the feature information of small target objects to be filtered out, thereby improving the rate and accuracy of the identification of small target objects. Furthermore, because the target object detection model reduces some large and medium objects as small objects during the training of the target object detection model, the proportion of the loss of the small target objects in the total loss is therefore increased, so that the optimization direction of the model to identify small target objects can be adjusted, which further improves the detection effect of the target object detection model on small target objects.

In this embodiment, the object detection method is applied to a service robot. The service robot uses its own RGB camera to collect a large number of images of target objects (i.e., object images), and uses the above-mentioned target object detection mode which is improved based on the YOLOv3-Tiny model to perform offline training while adding a special training strategy (i.e., reducing some large and medium objects as small objects for training) to improve the contribution of the loss of the small target objects to the total loss during the training, so that the model pays more attention to learning the features of small target objects. After the model is successfully trained offline on frameworks such as Pytorch or TensorFlow, it can be deployed online to the service robot using the inference engine such as NCNN, TensorRT or OpenVINO to further reduce the inference time and finally realize the real-time detection of the model on the service robot, which reduces the inference while ensuring the accuracy rate, and the purpose of fast and accurate detection can be realized.

In the provided target detection method, the system collects object images, and inputs the object image into the pre-built target object detection model, then obtains the coordinate of the target object in the object image after feature extraction and classification. In which, the target object detection model is a target object detection model improved based on the YOLOv3-Tiny model, which can fuse low-level information and high-level information. The system marks the position of the target object on the object image according to the coordinate of the target object. In the target object detection model improved based on the YOLOv3-Tiny model, the low-level information and high-level information are fused through the model structure, so that the low-level information can be further used, and the comprehensiveness of target detection is effectively improved and the detection effect of small targets is improved. The target object detection model trained on the basis of this model structure can be used to accurately identify small target objects in the input images, which improves the detection effect of small target objects while ensuring the detection speed of the target object.

Figure 5:
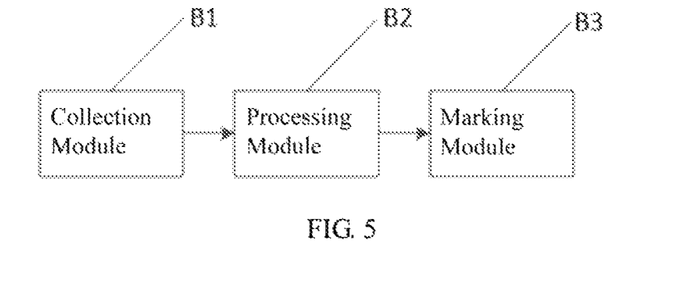
FIG. 5 is a schematic block diagram of an embodiment of an object detection apparatus according to the present disclosure.

FIG. 5 is a schematic block diagram of an embodiment of an object detection apparatus according to the present disclosure. An object detection apparatus is provided. As shown in FIG. 5, the apparatus includes:

a collection module B1 configured to collect one or more object images;

a processing module B2 configured to input the one or more object images into a pre-built target object detection model, and obtain a coordinate of a target object in the one or more object images through feature extraction and classification, where the target object detection model is obtained through any of the above-mentioned method for training the target object detection model; and a marking module B3 configured to mark a position of the target object on the one or more object images according to the coordinate.

In this embodiment, each module of the object detection apparatus is configured to execute each step in the above-mentioned object detection method, and the implementation is not described in detail herein.

In the provided object detection apparatus, the system collects object images, and inputs the object image into the pre-built target object detection model, then obtains the coordinate of the target object in the object image after feature extraction and classification. In which, the target object detection model is a target object detection model improved based on the YOLOv3-Tiny model, which can fuse low-level information and high-level information. The system marks the position of the target object on the object image according to the coordinate of the target object. In the target object detection model improved based on the YOLOv3-Tiny model, the low-level information and high-level information are fused through the model structure, so that the low-level information can be further used, and the comprehensiveness of target detection is effectively improved and the detection effect of small targets is improved. The target object detection model trained on the basis of this model structure can be used to accurately identify small target objects in the input images, which improves the detection effect of small target objects while ensuring the detection speed of the target object.

Figure 6:
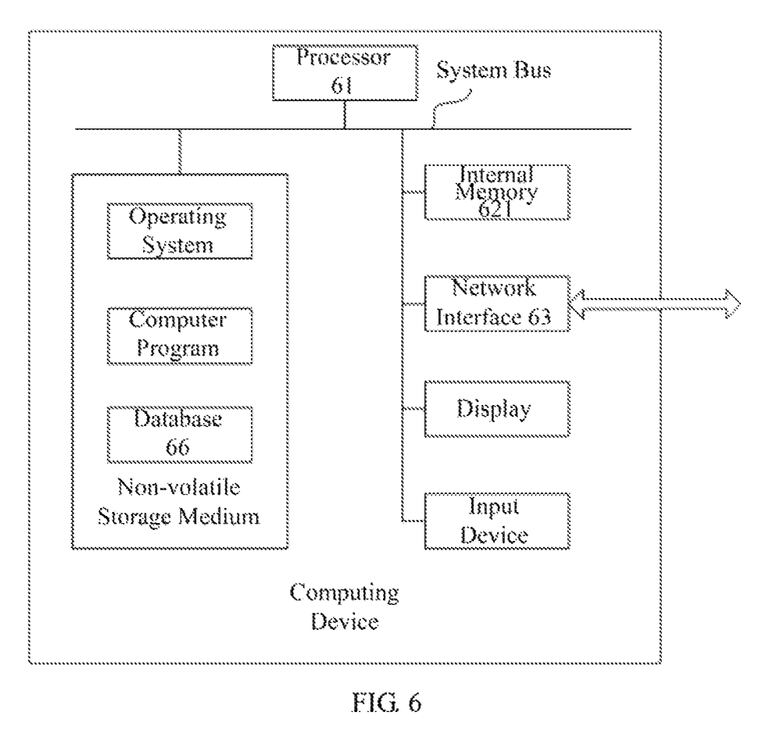
FIG. 6 is a schematic block diagram of an embodiment of a computing device according to the present disclosure.

FIG. 6 is a schematic block diagram of an embodiment of a computing device according to the present disclosure. A computing device is provided. The computer device may be a server. As shown in FIG. 6, the computing device includes a processor 61, a storage, a network interface 63, and a database 64 which are connected via a system bus. In which, the processor 61 is for realizing calculations and controls. The storage includes a non-volatile storage medium and an internal memory 621. The non-volatile storage medium stores an operating system, a computer program, and the database 64. The internal memory 621 provides an environment for the execution of the operating system and computer program in the non-volatile storage medium. The database 64 is for storing the target object detection models and other data. The network interface 63 is for connecting and communicating with an external terminal via a network. When the computer program is executed by the processor 61, the above-mentioned target object detection model training method is implemented, where the structure of the used target object detection model is the same as the structure of any of the above-mentioned target object detection models.

The steps of the above-mentioned target object detection model training method that are executed by the processor include:

S1: obtaining a plurality of first training samples, where each of the first training samples is an image marked with one or more target object(s); and S2: inputting each of the first training samples to the target object detection model to perform iterative training until a target total loss obtained in a current iterative training is consistent with another target total loss obtained in a previous iterative training.

Furthermore, the target total loss is the sum of a plurality of target object losses, and the step of inputting each of the first training samples to the target object detection model to perform iterative training includes:

S201: selecting a total loss of small target objects from each of the target object losses according to a preset size, where the size of the small target objects corresponds to the preset size;

S202: determine whether a ratio between the total loss of the small target objects and the target total loss is smaller than a threshold in the current iterative training; and S203: splicing every preset number of the first training samples into an image to obtain a plurality of second training samples and training the target object detection model using each of the second training samples before a next iterative training, in response to the ratio being smaller than the threshold.

Furthermore, the step of splicing every preset number of the first training samples into the image to obtain the plurality of second training samples and training the target object detection model using each of the second training samples includes:

S2031: selecting a preset number of the first training samples randomly to reduce according to a preset ratio to obtain a plurality of third training samples, where an image aspect ratio of the third training sample is equal to an image aspect ratio of the first training sample;

S2032: splicing the third training samples into a same image to obtain the second training sample, where an image size of the second training sample is consistent with an image size of the first training sample.

When the computer program is executed by the processor, it further implements an object detection method. The steps of the above-mentioned object detection method executed by the above-mentioned processor include:

A1: collecting object image(s);

A2: inputting the object image(s) into a pre-built target object detection model, and obtaining a coordinate of a target object in the object image(s) through feature extraction and classification, where the target object detection model is obtained through any one of the above-mentioned the method for training the target object detection model; and A3: marking a position of the target object on the object image(s) according to the coordinate.

The present disclosure further provides a non-transitory computer-readable storage medium storing a computer program. When the computer program is executed by a processor, the above-mentioned target object detection model training method is implemented. The structure of the used target object detection model is the same as the structure of any of the above-mentioned target object detection model. The target object detection model training method includes:

S1: obtaining a plurality of first training samples, where each of the first training samples is an image marked with one or more target object(s); and S2: inputting each of the first training samples to the target object detection model to perform iterative training until a target total loss obtained in a current iterative training is consistent with another target total loss obtained in a previous iterative training.

Furthermore, the target total loss is the sum of a plurality of target object losses, and the step of inputting each of the first training samples to the target object detection model to perform iterative training includes:

S201: selecting a total loss of small target objects from each of the target object losses according to a preset size, where the size of the small target objects corresponds to the preset size;

S202: determine whether a ratio between the total loss of the small target objects and the target total loss is smaller than a threshold in the current iterative training; and S203: splicing every preset number of the first training samples into an image to obtain a plurality of second training samples and training the target object detection model using each of the second training samples before a next iterative training, in response to the ratio being smaller than the threshold.

Furthermore, the step of splicing every preset number of the first training samples into the image to obtain the plurality of second training samples and training the target object detection model using each of the second training samples includes:

S2031: selecting a preset number of the first training samples randomly to reduce according to a preset ratio to obtain a plurality of third training samples, where an image aspect ratio of the third training sample is equal to an image aspect ratio of the first training sample;

S2032: splicing the third training samples into a same image to obtain the second training sample, where an image size of the second training sample is consistent with an image size of the first training sample.

When the computer program is executed by a processor, it further implements an object detection method. The method includes:

A1: collecting object image(s);

A2: inputting the object image(s) into a pre-built target object detection model, and obtaining a coordinate of a target object in the object image(s) through feature extraction and classification, where the target object detection model is obtained through any one of the above-mentioned the method for training the target object detection model; and A3: marking a position of the target object on the object image(s) according to the coordinate.

It can be understood by those skilled in the art that, all or part of the process of the method of the above-mentioned embodiment can be implemented by a computer program to instruct related hardware. The program can be stored in a non-volatile computer readable storage medium. When the program is executed, which can include the process of each method embodiment as described above. In which, any reference to a storage, a memory, a database or other medium used in each embodiment provided by the present disclosure may include non-volatile and/or volatile memory. Non-volatile memory can include read only memory (ROM), programmable ROM (PROM), electrically programmable ROM (EPROM), electrically erasable programmable ROM (EEPROM), or flash memory. Volatile memory can include random access memory (RAM) or external cache memory. As a description rather than a limitation. RAM can be in a variety of formats such as static RAM (SRAM), dynamic RAM (DRAM), synchronous DRAM (SDRAM), double data rate SDRAM (DDRSDRAM), enhanced SDRAM (ESDRAM), synchronous link DRAM (SLDRAM), rambus direct RAM (RDRAM), direct rambus DRAM (DRDRAM), and rambus DRAM (RDRAM).

It should be noted that, in the present disclosure, the terms "include", "comprise" or any other variants thereof are intended to cover non-exclusive inclusion, so that a process, apparatus (or device), article or method including a series of elements not only includes those elements but also includes other elements that are not explicitly listed, or further includes elements inherent to the process, apparatus, article, or method. If there are no mom restrictions, the element defined by the sentence "including a . . . " does not exclude the existence of other identical elements in the process, apparatus, article, or method that includes the element.

The forgoing descriptions are only the embodiments of the present disclosure, while do not limit the scope of this present disclosure. Any equivalent structure or equivalent process transformation made using the content of the description and drawings of the present disclosure, or directly or indirectly applying the embodiments to other related technology is similarly included in the scope of the present disclosure.

What is claimed is:

1. A computer-implemented training method for a target object detection model based on a YOLOv3-Tiny model, comprising:

obtaining a plurality of first training samples, wherein each of the first training samples is an image marked with one or more target objects;

inputting each of the first training samples to the target object detection model to perform an iterative training to obtain a trained target object detection model; and storing the trained target object detection model on a non-transitory computer readable storage medium to use the trained target object detection model for an object detection;

wherein the YOLOv3-Tiny model has an input receiving an image, and the target object detection model comprises:

a first convolutional layer connected to a first low-level information output end (101) of the YOLOv3-Tiny model to receive and perform convolution on low-level information of the image;

wherein the first convolutional layer has an output end connected to a first concatenating layer of the YOLOv3-Tiny model, a high-level information output end (201) of the YOLOv3-Tiny model is connected to and outputs high-level information of the image to the first concatenating layer, the first concatenating layer concatenates the low-level information and high-level information and outputs the concatenated information to first high-level information convolutional layers (301) of the YOLOv3-Tiny model, thereby realizing fusing multi-level information; and wherein the target object detection model further comprises:

a second convolutional layer connected to a second low-level information output end (102) of the YOLOv3-Tiny model to receive and perform convolution on the low-level information of the image; and a second concatenating layer connected to the second convolutional layer and another high-level information output end (202) of the YOLOv3-Tiny model, to concatenate information, and wherein convolution is performed on the concatenated information from the second concatenating layer by second high-level information convolutional layers (302) of the YOLOv3-Tiny model.

2. The training method of claim 1, wherein the YOLOv3-Tiny model comprises six convolutional layers (Conv1-Conv6) and six pooling layers (Pool1-Pool6) alternately connected to the input in series;

the second pooling layer (Pool2) has the first low-level information output end (101), the fourth convolutional layer (Conv4) has the second low-level information output end (102), the fifth convolutional layer (Conv5) has the high-level information output end (201), and the sixth pooling layer (Pool6) has the another high-level information output end (202).

3. The training method target object detection model of claim 1, wherein the second high-level information convolutional layers (302) of the YOLOv3-Tiny model comprise four convolutional layers (Conv7-Conv10) connected in series between the second concatenating layer and a first output; and wherein one of the four convolutional layers (Conv7-Conv10) is connected to the first concatenating layer through a high-level information convolutional layer (Cony-high) and an upsampling layer.

4. The training method of claim 1, wherein the first high-level information convolutional layers (301) of the YOLOv3-Tiny model comprise two convolutional layers (Conv11-Conv12) connected in series between the first concatenating layer and an output.

5. A non-transitory computer readable storage medium for storing a target object detection model based on a YOLOv3-Tiny model, the YOLOv3-Tiny model having an input receiving an image, the target object detection model comprising:

a first convolutional layer connected to a first low-level information output end (101) of the YOLOv3-Tiny model to receive and perform convolution on low-level information of the image;

wherein the first convolutional layer has an output end connected to a first concatenating layer of the YOLOv3-Tiny model, a high-level information output end (201) of the YOLOv3-Tiny model is connected to and outputs high-level information of the image to the first concatenating layer, the first concatenating layer concatenates the low-level information and high-level information and outputs the concatenated information to first high-level information convolutional layers (301) of the YOLOv3-Tiny model, thereby realizing fusing multi-level information; and wherein the target object detection model further comprises:

a second convolutional layer connected to a second low-level information output end (102) of the YOLOv3-Tiny model to receive and perform convolution on the low-level information of the image; and\ a second concatenating layer connected to the second convolutional layer and another high-level information output end (202) of the YOLOv3-Tiny model, to concatenate information, and wherein convolution is performed on the concatenated information from the second concatenating layer by second high-level information convolutional layers (302) of the YOLOv3-Tiny model;

wherein the non-transitory computer readable storage medium further stores a computer program executable on a processor, and the computer program comprises:

instructions for collecting, by a camera of a service robot, object images;

instructions for inputting the object images into the target object detection model, and obtaining a coordinate of a target object in the object images through feature extraction and classification; and instructions for marking a position of the target object on the object images according to the coordinate.

6. The storage medium of claim 5, wherein the YOLOv3-Tiny model comprises six convolutional layers (Conv1-Conv6) and six pooling layers (Pool1-Pool6) alternately connected to the input in series;

the second pooling layer (Pool2) has the first low-level information output end (101), the fourth convolutional layer (Conv4) has the second low-level information output end (102), the fifth convolutional layer (Conv5) has the high-level information output end (201), and the sixth pooling layer (Pool6) has the another high-level information output end (202).

7. The storage medium of claim 5, wherein the second high-level information convolutional layers (302) of the YOLOv3-Tiny model comprise four convolutional layers (Conv7-Conv10) connected in series between the second concatenating layer and a first output; and wherein one of the four convolutional layers (Conv7-Conv10) is connected to the first concatenating layer through a high-level information convolutional layer (Cony-high) and an upsampling layer.

8. The storage medium of claim 5, wherein the first high-level information convolutional layers (301) of the YOLOv3-Tiny model comprise two convolutional layers (Conv11-Conv12) connected in series between the first concatenating layer and an output.

9. The training method of claim 1, wherein each of the first training samples is inputted to the target object detection model to perform the iterative training until a target total loss obtained in a current iterative training is consistent with another target total loss obtained in a previous iterative training.

10. The training method of claim 9, wherein the target total loss is a sum of a plurality of target object losses, and the step of inputting each of the first training samples to the target object detection model to perform the iterative training comprises:

selecting a total loss of small target objects from each of the target object losses according to a preset size, wherein a size of the small target objects corresponds to the preset size;

determining whether a ratio between the total loss of the small target objects and the target total loss is smaller than a threshold in the current iterative training; and splicing every preset number of the first training samples into an image to obtain a plurality of second training samples, and training the target object detection model using each of the second training samples before a next iterative training, in response to the ratio being smaller than the threshold.

11. The training method of claim 10, wherein the step of splicing every preset number of the first training samples into the image to obtain the plurality of second training samples comprises:
selecting a preset number of the first training samples randomly to reduce according to a preset ratio to obtain a plurality of third training samples, wherein an image aspect ratio of the third training sample is equal to an image aspect ratio of the first training sample; and
splicing the third training samples into a same image to obtain the second training sample, wherein an image size of the second training sample is consistent with an image size of the first training sample.

12. A computer-implemented object detection method applied to a service robot, comprising:
collecting, by a camera of the service robot, object images;
inputting, by an operating system of the service robot, the object images into a pre-built target object detection model based on a YOLOv3-Tiny model, and obtaining a coordinate of a target object in the object images through feature extraction and classification; and
marking, by the operating system, a position of the target object on the object images according to the coordinate;
wherein the YOLOv3-Tiny model has an input receiving an image, and the target object detection model comprises:
a first convolutional layer connected to a first low-level information output end (101) of the YOLOv3-Tiny model to receive and perform convolution on low-level information of the image; wherein the first convolutional layer has an output end connected to a first concatenating layer of the YOLOv3-Tiny model, a high-level information output end (201) of the YOLOv3-Tiny model is connected to and outputs high-level information of the image to the first concatenating layer, the first concatenating layer concatenates the low-level information and high-level information and outputs the concatenated information to first high-level information convolutional layers (301) of the YOLOv3-Tiny model, thereby realizing fusing multi-level information;
a second convolutional layer connected to a second low-level information output end (102) of the YOLOv3-Tiny model to receive and perform convolution on the low-level information of the image; and
a second concatenating layer connected to the second convolutional layer and another high-level information output end (202) of the YOLOv3-Tiny model, to concatenate information, and wherein convolution is performed on the concatenated information from the second concatenating layer by second high-level information convolutional layers (302) of the YOLOv3-Tiny model.

13. The object detection method of claim 12, wherein the YOLOv3-Tiny model comprises six convolutional layers (Conv1-Conv6) and six pooling layers (Pool1-Pool6) alternately connected to the input in series;
the second pooling layer (Pool2) has the first low-level information output end (101), the fourth convolutional layer (Conv4) has the second low-level information output end (102), the fifth convolutional layer (Conv5) has the high-level information output end (201), and the sixth pooling layer (Pool6) has the another high-level information output end (202).

14. The object detection method of claim 12,
wherein the second high-level information convolutional layers (302) of the YOLOv3-Tiny model comprise four convolutional layers (Conv7-Conv10) connected in series between the second concatenating layer and a first output; and
wherein one of the four convolutional layers (Conv7-Conv10) is connected to the first concatenating layer through a high-level information convolutional layer (Cony-high) and an upsampling layer.

15. The object detection method of claim 12, wherein the first high-level information convolutional layers (301) of the YOLOv3-Tiny model comprise two convolutional layers (Conv11-Conv12) connected in series between the first concatenating layer and an output.

16. The object detection method of claim 12, wherein the step of marking, by the operating system, a position of the target object on the object images according to the coordinate comprises:
framing, by the operating system, the target object on the object images using a frame according to the coordinate, so as to indicate a position of the target object on the object images.

17. The object detection method of claim 12, wherein the target object detection model is trained by:
obtaining a plurality of first training samples, wherein each of the first training samples is an image marked with one or more target objects; and
inputting each of the first training samples to the target object detection model to perform an iterative training.

18. The object detection method of claim 17, wherein each of the first training samples is inputted to the target object detection model to perform the iterative training until a target total loss obtained in a current iterative training is consistent with another target total loss obtained in a previous iterative training.

* * * * *